Patented Jan. 6, 1931

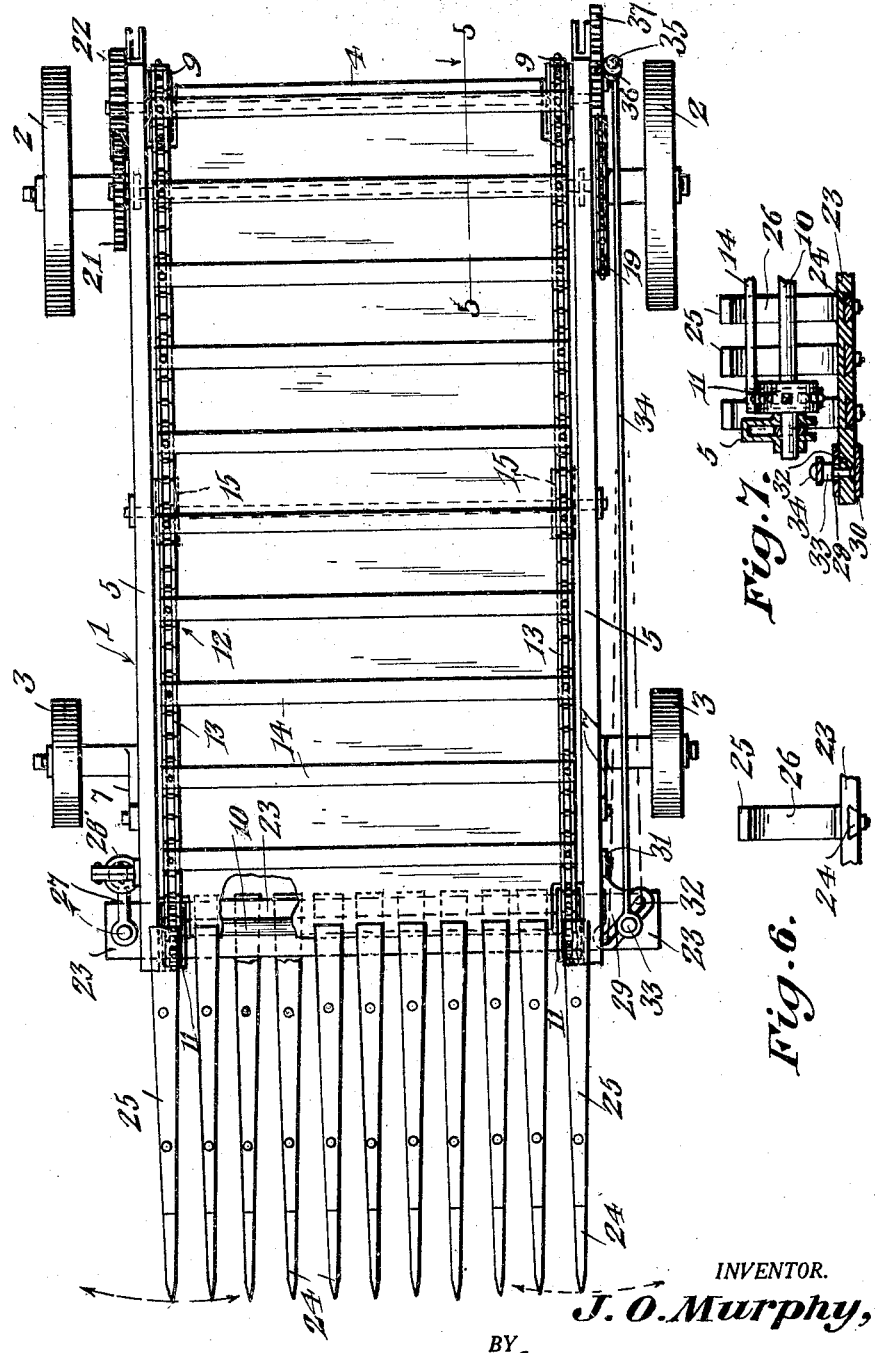

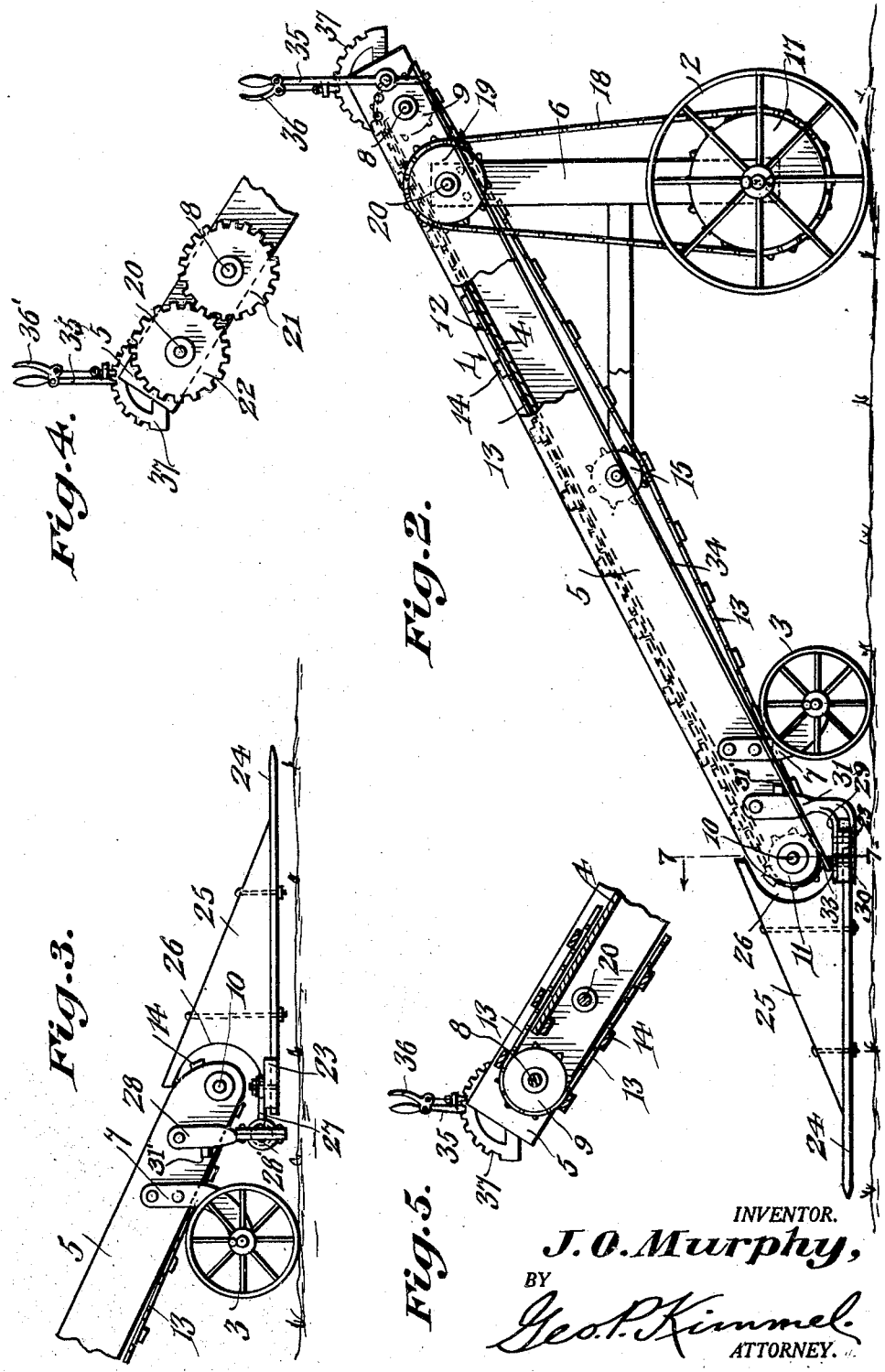

1,787,873

UNITED STATES PATENT OFFICE

JACK O. MURPHY, OF IMPERIAL, CALIFORNIA

HAY PICK-UP

Application filed July 31, 1929. Serial No. 382,478.

This invention relates to a hay pick-up and has for its primary object to provide, in a manner as hereinafter set forth, a device for picking up hay in shocks or from windrows and elevating the same to a wagon or the like.

A further object of the invention is to provide a device of the character aforesaid, by means of which hay may be picked up without turning it and may be elevated to a wagon or the like without tearing the hay apart or breaking off the leaves.

A further object of the invention is to provide a device of the character aforesaid, including a plurality of forwardly projecting teeth which may be swung bodily in a lateral arc in order that the hay may be picked up straight at turns in a windrow and at the ends thereof.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the same:

Figure 1 is a top plan of a hay pick-up in accordance with this invention.

Figure 2 is a side elevation thereof.

Figure 3 is a fragmentary side elevation as viewed from the opposite side from that shown in Figure 2.

Figure 4 is a fragmentary side elevation as viewed from the opposite side from that shown in Figure 2.

Figure 5 is a fragmentary section taken on line 5—5 of Figure 1.

Figure 6 is a detail view showing in end elevation one of the pick-up teeth and the rib carried thereby.

Figure 7 is a fragmentary section taken on line 7—7 of Figure 2.

Referring to the drawings in detail, the numeral 1 indicates generally an elevator which is mounted on a pair of rear wheels 2 and a pair of forward wheels 3 and which is adapted to be pushed in front of a wagon, portable baler, thrasher, or the like, not shown. The elevator 1 consists of a bed 4 secured between a pair of side members 5 from which a plurality of hangers 6 and 7 depend for connection with the axles of the wheels 2 and 3 respectively. The elevator 1 inclines upwardly and rearwardly and the front end thereof is disposed in spaced relation to the ground. Journaled in the side members 5, adjacent the rearward end of the elevator, is a shaft 8 upon each end of which is fixedly secured a sprocket 9. A similar shaft 10 is journaled in the side members 5, adjacent the forward end of the elevator 1, and fixedly secured to each end of the shaft 10 is a sprocket 11. Carried by the elevator is a conveyor indicated generally by the numeral 12 and consisting of a pair of endless chains 13, mounted on the sprockets 9 and 11 and connected together by means of a plurality of slats 14. Carried by the side members 5 is a pair of idler sprockets 15 over which the chains 13 pass and by means of which the chains may be maintained taut.

Fixedly secured to the hub 16 of one of the rear wheels 2 is a sprocket 17 which is operatively connected by means of a sprocket chain 18, with a sprocket 19 fixedly secured to one end of a shaft 20 which extends transversely of the elevator and is journaled in the side members 5. Fixedly secured to the opposite end of the shaft 20 is a gear 21 which is in mesh with a similar gear 22 fixedly mounted on the shaft 8. Thus it will be seen that upon the rotation of the sprocket 17, the conveyor 12 will be rotated in the opposite direction.

Supported beneath the forward end of the elevator is a cross member 23, to which is secured the rearward ends of a plurality of forwardly projecting teeth 24. Mounted on the upper face of each of the teeth 24 is a rib 25, which gradually increases in height from front to rear with its upper face merging into the upper face of the tooth 24 at the forward end of the rib. The rearward end of each of the ribs 25 is formed with a substantially semi-circular recess 26 for the reception therein of the forward end of the elevator 1. The cross member 23 is pivotally connected at one end to a forwardly projecting arm 27 pivotally carried as at 28′, by a hanger 28 pivotally secured to one of the side members 6. The opposite end of the cross member 23 is supported between a pair of spaced, superposed plates 29 and 30 which form a part of a hanger 31, pivotally secured to one of the side members 5. The pivoted connections between the hangers 28 and 31 and side member 5 permit the forward ends of the teeth to move in a vertical arc, the downward movement of which is limited by a stop 31′ adjacent each of the hangers 28 and 31 to preserve the forward ends of the teeth from digging into the ground. The upper plate 29 is formed with a diagonally extending slot 32, through which the upper end portion of a pin 33 projects. The pin 33 is fixedly secured at its lower end to the cross member 23 and is pivotally connected at its upper end to an operating rod 34, the forward end of which is pivotally connected with a lever 35 mounted on one of the side members 5. The lever 35 is provided with a latch member 36 for engagement with a ratchet 37 which is suitably mounted with respect to the lever 35.

In the operation of my hay pick-up, the device is pushed by any suitable means along a row of shocks or a windrow whereby the hay in the shocks or windrow is picked up by the teeth 24 and forced up the ribs 25 to the conveyor 12 which carries the hay to the rearward end of the elevator where it is delivered to whatever apparatus with which the pick-up is associated. If a turn in the windrow or row of shocks is encountered, the cross members 23 may be swung to right or left as desired by the manipulation of the lever 35. Such manipulation causes the pin 33 to ride along the walls of the slot 32 and due to the fixed connection between the pin 33 and cross member 23, the latter will be swung about its pivotal connection with the arm 27, whereby the teeth 24 will be swung bodily at an angle to the elevator 1. In this manner hay may be picked up by the teeth 24 even though such hay does not lie directly within the path of travel of the elevator 1. By this arrangement hay may be picked up clean at the ends of windrows during the turning movement of the device.

It is thought that the many advantages of a hay pick-up in accordance with this invention will be readily apparent, and although the preferred embodiment of the invention is as illustrated and described, it is to be understood that various changes in the details of construction may be resorted to, so long as such changes fall within the scope of the invention as defined in the appended claims.

What I claim is:

1. A hay pick-up comprising, an elevator adapted to be moved longitudinally of a windrow and having its forward end disposed in spaced relation to the ground, a forwardly projecting pick-up device carried by said forward end, and means for swinging the pick-up device in a horizontal arc to position the same at a lateral inclination to the elevator.

2. A hay pick-up comprising, an elevator adapted to be moved longitudinally of a windrow and having its forward end disposed in spaced relation to the ground, a cross member carried by said forward end, a plurality of teeth secured to the cross member and projecting forwardly therefrom, and means for swinging said cross member in a horizontal arc to position the same at a lateral inclination to the elevator.

3. A hay pick-up comprising, an elevator adapted to be moved longitudinally of a windrow and having its forward end disposed in spaced relation to the ground, a pick-up device carried by said forward end and including a plurality of forwardly projecting teeth, a rib on the upper face of each of said teeth, said ribs gradually increasing in height from front to rear, and means for swinging the pick-up device in a horizontal arc to position the same at a lateral inclination to the elevator.

4. A hay pick-up comprising, an elevator adapted to be moved longitudinally of a windrow and having its forward end disposed in spaced relation to the ground, a pick-up device carried by said forward end and including a plurality of forwardly projecting teeth, a rib on the upper face of each of said teeth, said ribs gradually increasing in height from front to rear, and means for swinging the pick-up device in a horizontal arc to position the same at a lateral inclination to the elevator, said ribs having their rearward ends formed with recesses for the reception therein of the forward end of said elevator.

5. A hay pick-up comprising, an elevator having its forward end disposed in spaced relation to the ground, a pair of hangers carried by the elevator and each having a horizontally disposed arm, a cross member pivoted to one of said arms, the other of said arms being formed with a diagonally disposed slot, a pin secured to said cross member and extending through said slot, an operating rod connected with said pin, and a plurality of teeth projecting forwardly from said cross member.

6. A hay pick-up comprising, an elevator having its forward end disposed in spaced relation to the ground, a hanger carried by the elevator and having a horizontally disposed arm, a cross member pivoted at one end to said arm, a hanger carried by the elevator and having a pair of spaced, superposed plates between which the other end of said cross member extends, the uppermost of said spaced arms being formed with a diagonally disposed slot, a pin secured to said cross member and extending through said slot, an operating rod connected with said pin, and a plurality of teeth projecting forwardly from said cross member.

7. In a hay pick-up, a pick-up device including a cross member having a plurality of teeth projecting forwardly therefrom, means for supporting said cross member in spaced relation to the ground, and means for swinging the cross member in a horizontal arc.

In testimony whereof, I affix my signature hereto.

JACK O. MURPHY.